(12) United States Patent
Walkes (10) Patent No.: US 8,590,060 B2
(45) Date of Patent: Nov. 19, 2013

(54) VIRTUAL REMOVABLE DISK DEVICE FOR REMOVABLE STORAGE MEDIA

(75) Inventor: Daniel J. Walkes, Superior, CO (US)

(73) Assignee: Tandberg Data Holdings S.A.R.L., Luxembourg (LU)

( * ) Notice: Subject to any disclaimer, the term of this patent is extended or adjusted under 35 U.S.C. 154(b) by 283 days.

(21) Appl. No.: 12/901,394

(22) Filed: Oct. 8, 2010

(65) Prior Publication Data

US 2012/0090022 A1 Apr. 12, 2012

(51) Int. Cl.
*G08B 29/00* (2006.01)
*G06F 7/04* (2006.01)
*G06F 12/14* (2006.01)
*G06F 13/00* (2006.01)

(52) U.S. Cl.
USPC ............. 726/34; 726/17; 726/19; 713/190; 713/194; 711/100; 711/115; 711/154; 711/163; 711/164

(58) Field of Classification Search
USPC ........ 726/19, 17, 34; 713/190, 194; 711/100, 711/115, 154, 163, 164
See application file for complete search history.

(56) References Cited

U.S. PATENT DOCUMENTS

| | | | |
|---|---|---|---|
| 5,297,124 | A | 3/1994 | Plotkin et al. |
| 5,644,444 | A | 7/1997 | Braithwaite et al. |
| 5,913,215 | A | 6/1999 | Rubinstein et al. |
| 6,862,173 | B1 | 3/2005 | Konshak et al. |
| 6,904,477 | B2 | 6/2005 | Padmanabhan et al. |
| 7,055,026 | B2 | 5/2006 | Gere |
| 2002/0104038 | A1 | 8/2002 | Harmer |
| 2002/0159182 | A1 | 10/2002 | Albrecht et al. |
| 2003/0099147 | A1* | 5/2003 | Deng et al. ............... 365/230.05 |
| 2003/0135672 | A1 | 7/2003 | Yip et al. |
| 2004/0098244 | A1 | 5/2004 | Dailey et al. |
| 2004/0181388 | A1 | 9/2004 | Yip et al. |
| 2006/0007576 | A1 | 1/2006 | Georgis |
| 2006/0010285 | A1 | 1/2006 | Georgis |
| 2006/0156035 | A1* | 7/2006 | Tran et al. .................... 713/193 |
| 2007/0124365 | A1 | 5/2007 | Chen et al. |
| 2007/0214369 | A1* | 9/2007 | Roberts et al. ............... 713/192 |
| 2008/0052709 | A1* | 2/2008 | Tang ................................. 718/1 |
| 2009/0204978 | A1 | 8/2009 | Lee et al. |
| 2010/0005482 | A1 | 1/2010 | Mukker et al. |
| 2010/0023956 | A1 | 1/2010 | Bondurant et al. |

OTHER PUBLICATIONS

Tanenbaum, Andrew S., "Structured Computer Organization", 2nd Edition, 1984, Prentice-Hall Inc., Englewood Cliffs, NJ, pp. 10-12.
Microsoft Computer Dictionary 5th Edition, 2002, Microsoft Press, p. 177.
The Authoritative Dictionary of IEEE Standards Terms, 7th Edition, 2000, IEEE Press, p. 339.
International Search Report and Written Opinion of PCT/US2011/055460 mailed on Mar. 2, 2012, 9 pages.

* cited by examiner

*Primary Examiner* — Aravind Moorthy
(74) *Attorney, Agent, or Firm* — Kilpatrick Townsend & Stockton LLP (57) ABSTRACT

A method and apparatus for interfacing a host computer with a hard drive cartridge is disclosed in one embodiment. The virtual device interface is divided between a kernel component in a driver stack of the kernel space and a user component configured to run in user space. The kernel component passes data commands from the operating system to a cartridge dock while separating other commands that are passed to the user component. The user component authenticates the kernel component and/or the hard drive cartridge. Use of the removable hard drive cartridge is also authorized by the user component.

21 Claims, 9 Drawing Sheets

VIRTUAL REMOVABLE DISK DEVICE FOR REMOVABLE STORAGE MEDIA

BACKGROUND

This disclosure relates in general to removable disk products and, but not by way of limitation, to persistence device reservation.

There are removable hard drives that can attach to the various connections of a computer (SATA, eSATA, USB, PATA, SCSI, FireWire, etc.). The removable hard drives are attached to the computer and mounted to have a drive letter assigned by the operating system (OS). Certain other media reserve a drive letter waiting for media insertion such as floppy disks and compact discs. Hard drives do not reserve a drive letter until mounted.

Tape cartridges typically require specialized tape drives that spool and play tape media. These tape drives use SCSI commands and SCSI interfaces, and are customized for particular tapes. Larger capacity tapes are developed on occasion, but old tape drives cannot read the new tapes. Users upgrade their drives to use the new tapes, but often the upgraded drives do not read old type formats.

Custom drivers are known to interface with tape or other drivers. Where these drivers are subject to Open Source licensing, they are easy to analyze and possibly thwart security measures. There are good reasons to authenticate and authorize cartridges, but if the security measures are well known, it is likely the security measures will be hacked. Often the price of tape drives are subsidized with the strategy being to recover revenue from the tape cartridges.

SUMMARY

In one embodiment, the present disclosure provides a method and apparatus for interfacing a host computer with a hard drive cartridge. The virtual device interface is divided between a kernel component in a driver stack of the kernel space and a user component configured to run in user space. The kernel component passes data commands from the operating system to a cartridge dock while separating other commands that are passed to the user component. The user component authenticates the kernel component and/or the hard drive cartridge. Use of the removable hard drive cartridge is also authorized by the user component.

In another embodiment, a virtual device interface for a removable hard drive cartridge is disclosed. The virtual device interface comprises a kernel component and a user component. The kernel component is configured to run in kernel space in a driver stack of an operating system. The kernel component passes a first set of commands to a drive interface port while separating out a second set of commands. The user component is configured to run in user space. The user component: receives the second set of commands from the kernel component, authenticates one or both of the kernel component and the removable hard drive cartridge, and authorizes use of the removable hard drive cartridge.

In yet another embodiment, a virtual device interface for a removable hard drive cartridge is disclosed. The virtual device interface comprises a first component and a second component. The first component passes a first set of commands to a drive interface port while separating out a second set of commands. The second component: receives the second set of commands from the first component, authenticates one or both of the first component and the removable hard drive cartridge, and authorizes use of the removable hard drive cartridge. The first component runs in either kernel space in a driver stack of an operating system or in user space. The first component runs in either kernel space in the driver stack of the operating system or in user space.

In still another embodiment, a storage media with virtual device interface code for execution on a processor to operate a removable hard drive cartridge is disclosed. The virtual device interface code comprising code for a first component and a second component. The first component passes a first set of commands to a drive interface port while separating out a second set of commands. The second component: receives the second set of commands from the first component, authenticates one or both of the first component and the removable hard drive cartridge, and authorizes use of the removable hard drive cartridge. The first component runs in either kernel space in a driver stack of an operating system or in user space. The first component runs in either kernel space in the driver stack of the operating system or in user space.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1A:
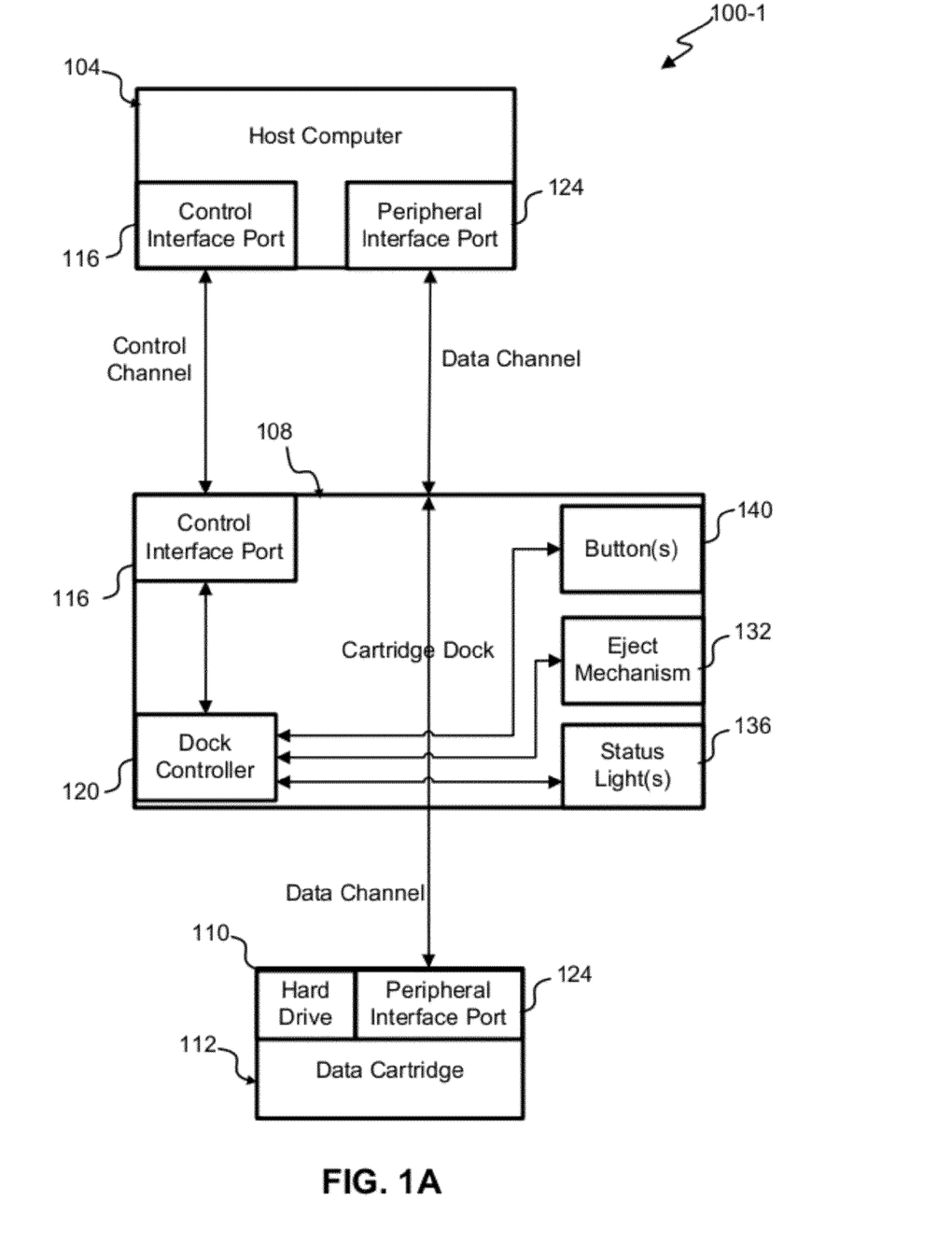
FIGS. 1A and 1B depict block diagrams of embodiments of a removable hard drive system.

Referring first to FIG. 1A, an embodiment of a removable hard drive system 100-1 is shown. A host computer 800 is coupled to a removable cartridge dock 108 with one or more interfaces. The removable cartridge dock 108 removably-accepts a hard drive data cartridge 112. The data cartridge 112 is received through an aperture of the removable cartridge dock 108. Keying on the aperture prevents the data cartridge 112 from being inserted improperly. Although not shown, other embodiments could have a host computer supporting any number of cartridge docks, libraries, mechanical insertion mechanisms, robotic cartridge transport, etc.

This embodiment has a control interface ports 116 and peripheral interface ports 124 that mate directly or using a cable or wirelessly. The peripheral interface port 124 (e.g., SATA, PATA, eSATA, SCSI, FireWire, USB, wireless USB, UWB, PCI, miniPCI, etc) on the host computer 800 connects to a mating peripheral interface port 124 of the data cartridge 112. The data cartridge 112 in this embodiment partially encloses a spinning or solid state hard drive 110 with the peripheral interface port 124 on the hard drive 110 being exposed outside a cartridge housing. Other embodiments could have the hard drive 110 connect to a connector that is coupled to the peripheral interface port 124.

The cartridge dock 108 mechanically holds the data cartridge 112 in place when coupled to the host computer 800. The cartridge dock 108 could be internal to the host computer 800 or in an external enclosure. Although not shown, the cartridge dock has two peripheral interface ports to pass through data/commands sent from the host computer 800 to the data cartridge 112. In other embodiments, the peripheral interface port 124 on the data cartridge could couple directly or through a cable to the peripheral interface port 124 of the host computer.

The host computer 800 uses the connection to the cartridge dock 108 through the control interface ports 116 to manage functionality of the cartridge dock 108. The control interface ports 116 could use intelligent platform management interface (IPMI), inter-integrated circuit (I2C), service provider interface (SPI), USB and/or other types of interfaces for the control channel. The control channel is used to communicate when a change in load status is detected by the cartridge dock 108, eject by software or activation of a button 140, changes to status lights 132 or other display, activate the eject mechanism 132, state of the write protect switch on the data cartridge 112, and/or other functionality of the cartridge dock 108 and/or data cartridge 112.

The cartridge dock 108 passes the data channel unchanged in this embodiment, but could amplify, buffer or perform electrical/protocol translation in other embodiments. The control channel is received with a control interface port 116 and passed to a dock controller 120. The dock controller could include a processor and/or state machines to manage the button(s) 140, eject mechanism 132, status light(s) 136, and other optional functionality. Other embodiments could include a display on the cartridge dock that is updated through the control channel. In some embodiments, metrics could be gathered by the dock controller such as temperature, cartridge bar code or serial number, current consumption, power supply health, etc.

Figure 1B:
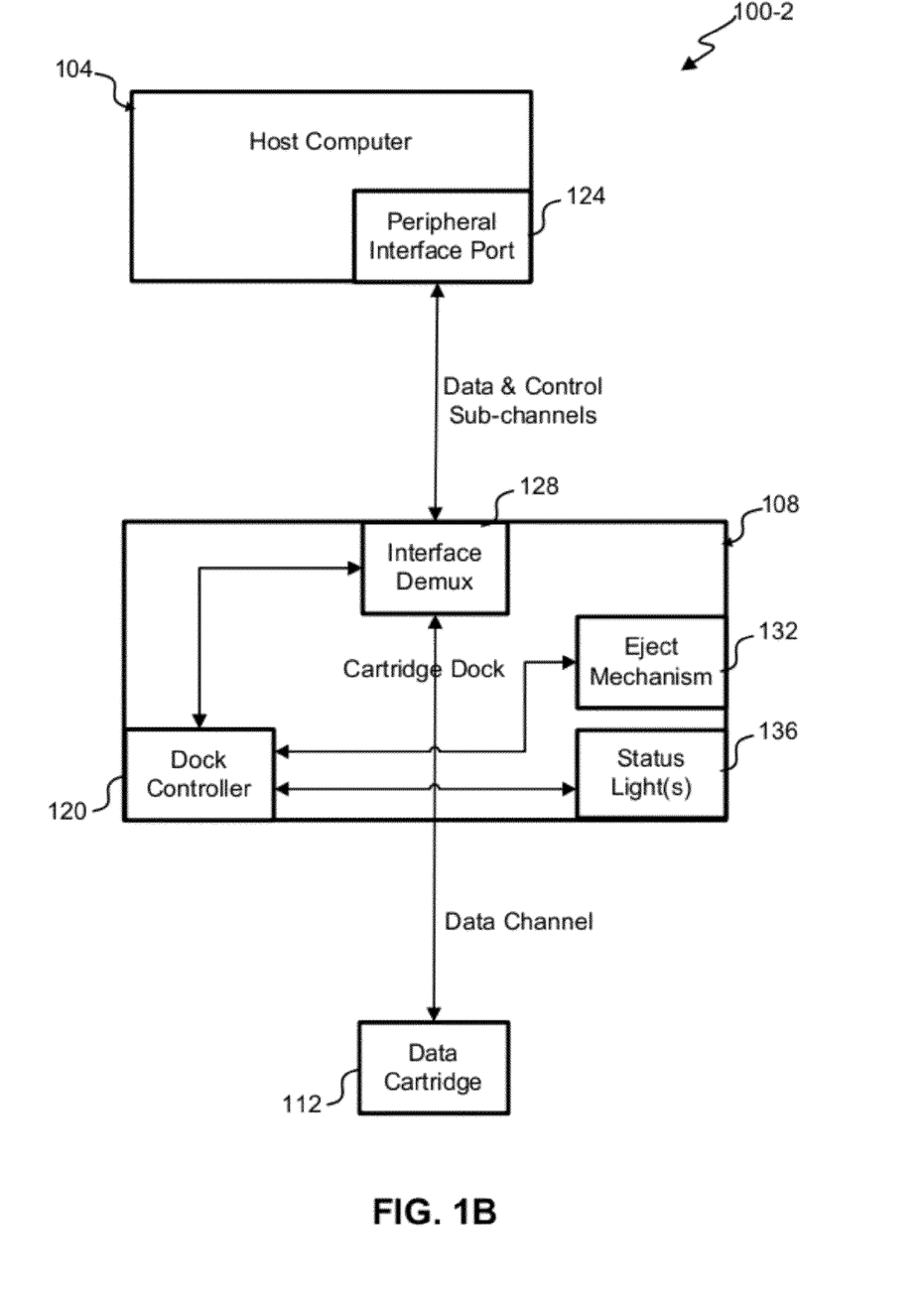

With reference to FIG. 1B, another embodiment of a removable hard drive system 100-2 is shown. This embodiment opens a sub-channel between host computer 104 and cartridge dock 108 to pass control information. The host computer configures a data sub-channel and control sub-channel over the same peripheral interface port 124. For example, two SATA channels are configured to separate the control from data on the common interface. Within the cartridge dock 108, an interface demultiplexer 128 divides the two sub-channels.

Control information is coupled to the dock controller 120 and data information is passed to the data cartridge. For example, the interface demultiplexer 128 could be configured such that the data cartridge 112 is on one SATA port and the dock controller 120 is on another. The dock controller 120 could send and receive information using a SATA protocol. Off-the-shelf port multiplier circuits could be used for the interface demultiplexer. The dock controller 120 could be a custom ASIC or FPGA to support sending control information on a sub-channel. Alternatively, the dock controller 120 could leverage the system message bus (SMB) functionality built-into some port multiplier circuits to perform a SATA to I2C conversion on the control sub-channel. The I2C port could directly interact with dock controller 120 hardware or interface to a low cost microcontroller used for this purpose in one embodiment.

Figure 2:
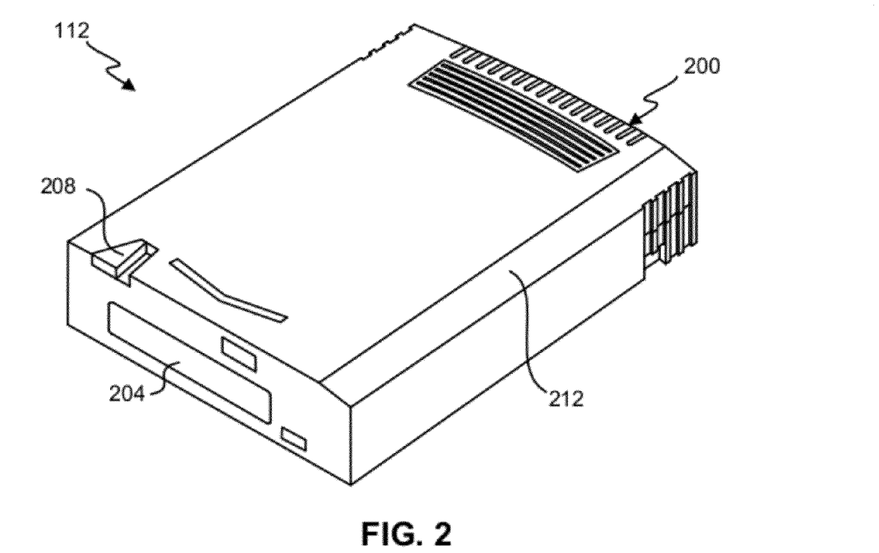
FIG. 2 depicts a diagram of an embodiment of a data cartridge.

Referring next to FIG. 2, an embodiment of the data cartridge 112 is shown. This embodiment places a plastic shell 200 to enclose a hard disk drive or solid state drive. The peripheral interface port 124 on the disk drive is exposed through an aperture 204 in the plastic shell. A write protect switch 208 indicates if the cartridge dock 108 is allowed to write to the data cartridge 112. A sensor in the cartridge dock reads the state of the write protect switch 208. A keying feature 212 runs the length of the data cartridge 112 such that a beveled corner in an aperture of the cartridge dock 108 prevents improper insertion of the data cartridge 112.

Figure 3A:
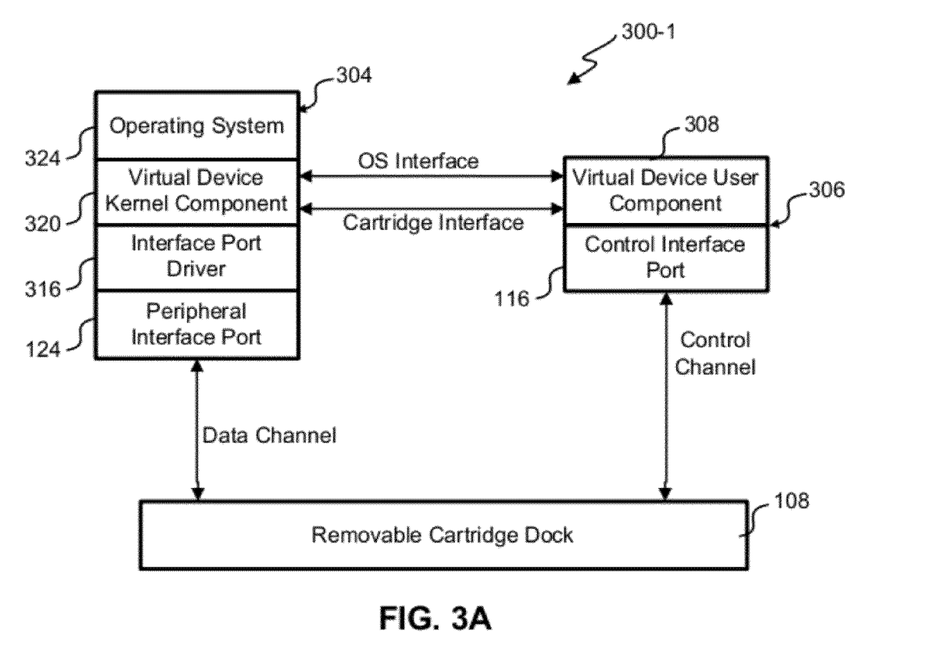
FIGS. 3A and 3B depict block diagrams of embodiments of a software architecture.

With reference to FIG. 3A, an embodiment of a software architecture 300-1 is shown interfaced with the removable cartridge dock 108. The software architecture 300-1 is generally divided into a kernel space 304 and a user space 306. It is generally more difficult to add software code to the kernel space 304 than the user space 306. Additionally, in some operating systems there are open source licensing requirements for the kernel space 304 that are more stringent than the user space 306. A virtual device kernel component (VDKC) 320 and virtual device user component (VDUC) 308 are produced to support the functionality of the removable cartridge dock 108 in this embodiment. In this embodiment, the VDKC 320 is GPL version 2 licensed, but the VDUC 308 is not open sourced.

The kernel space 304 includes an operating system (OS) 304 (e.g., UNIX, LINUX, Windows, etc.) interfaced with the VDKC 320. The VDKC 320 interacts with a interface port driver 316, which is a software driver typically supplied as part of the OS or by the hardware manufacturer of the peripheral interface port 124. In this embodiment, the peripheral interface port 124 is a SATA port that could be internal to the host computer 104 or an eSATA port that is externally available.

The user space 306 includes application software that runs on the OS 324. A VDUC 308 interfaces with the VDKC 320 to operate the cartridge dock 108. The control interface port 116 is accessed by the VDUC 308 to establish a control channel with the cartridge dock 108. There could be a software driver in the kernel space 304 in other embodiments, but this embodiment of the VDUC 308 interacts directly with the control interface port 116. The control interface port 116 could be built into the motherboard of the host computer 104 or could be an add on board or card.

In some embodiments, the kernel and user component could potentially be combined. For operating systems without licensing restrictions (i.e., Windows™), the functionality in the user space could be placed in the kernel space or vice versa. In another embodiment, the functionality of the VDKC and the VDUC could be compiled into the operating system.

Figure 3B:
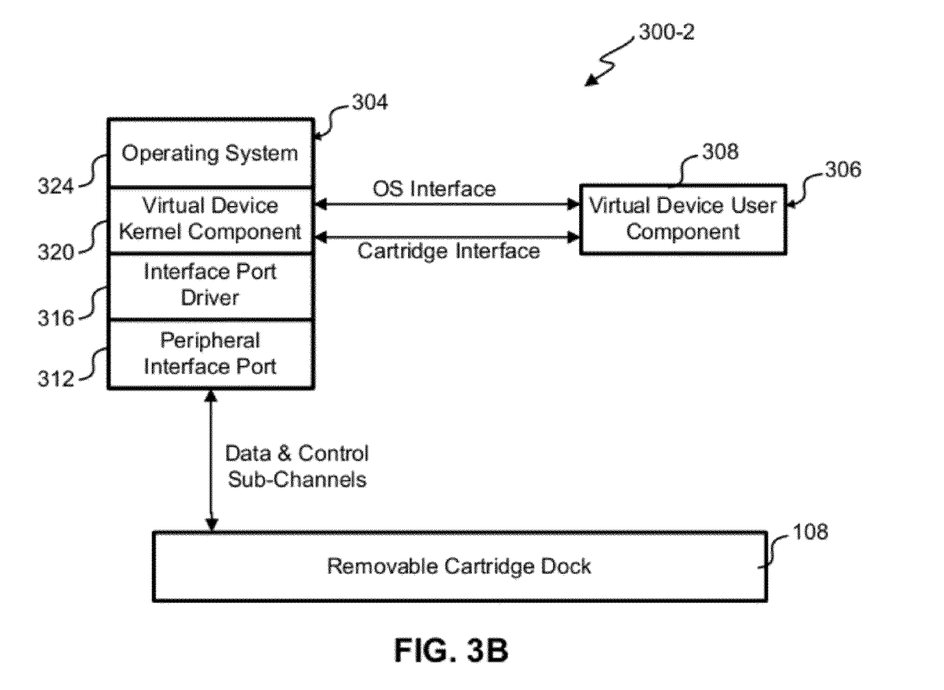

Referring next to FIG. 3B, another embodiment of a software architecture 300-2 is shown interfaced with the removable cartridge dock 108. In this embodiment, the VDUC 308 communicates control information through the VDKC 320. A control sub-channel uses the same peripheral interface port 312 as the data sub-channel. The cartridge dock 108 strips off the control sub-channel for use within the cartridge dock 108.

Figure 4:
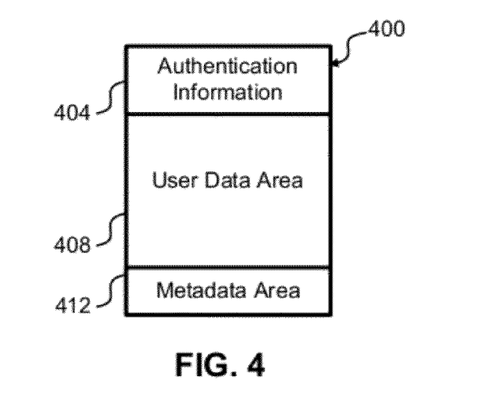
FIG. 4 depicts a block diagram of an embodiment of a data structure for a hard drive.

With reference to FIG. 4, an embodiment of a data structure 400 for the hard drive 100 is shown. The hard drive 110 in this embodiment is an off-the-shelf rotating hard drive with the entire accessible area available for user data normally. The VDKC 320, VDUC 308 and/or the cartridge dock 108 recognize the data structure 400 shown in FIG. 4. There is authentication information 404 and metadata information 412, that is not normally accessible by the host computer 104. The metadata could be health information on the hard drive, read and/or write protection information for the user data area 408 or anything else for storage on the data cartridge 112 in a manner inaccessible to the other host computer software. The VDUC 308 provides offset information to the VDKC 320 once certain conditions are met. The user data area 408 is what appears to the host computer software to be available on the data cartridge 112. The hard drive 110 can be password protected and have the data stored on it cryptographically protected. Other embodiments could split up the authentication information 404 and metadata area 412 to not be contiguous or to be anywhere in the data structure 400.

Figure 5A:
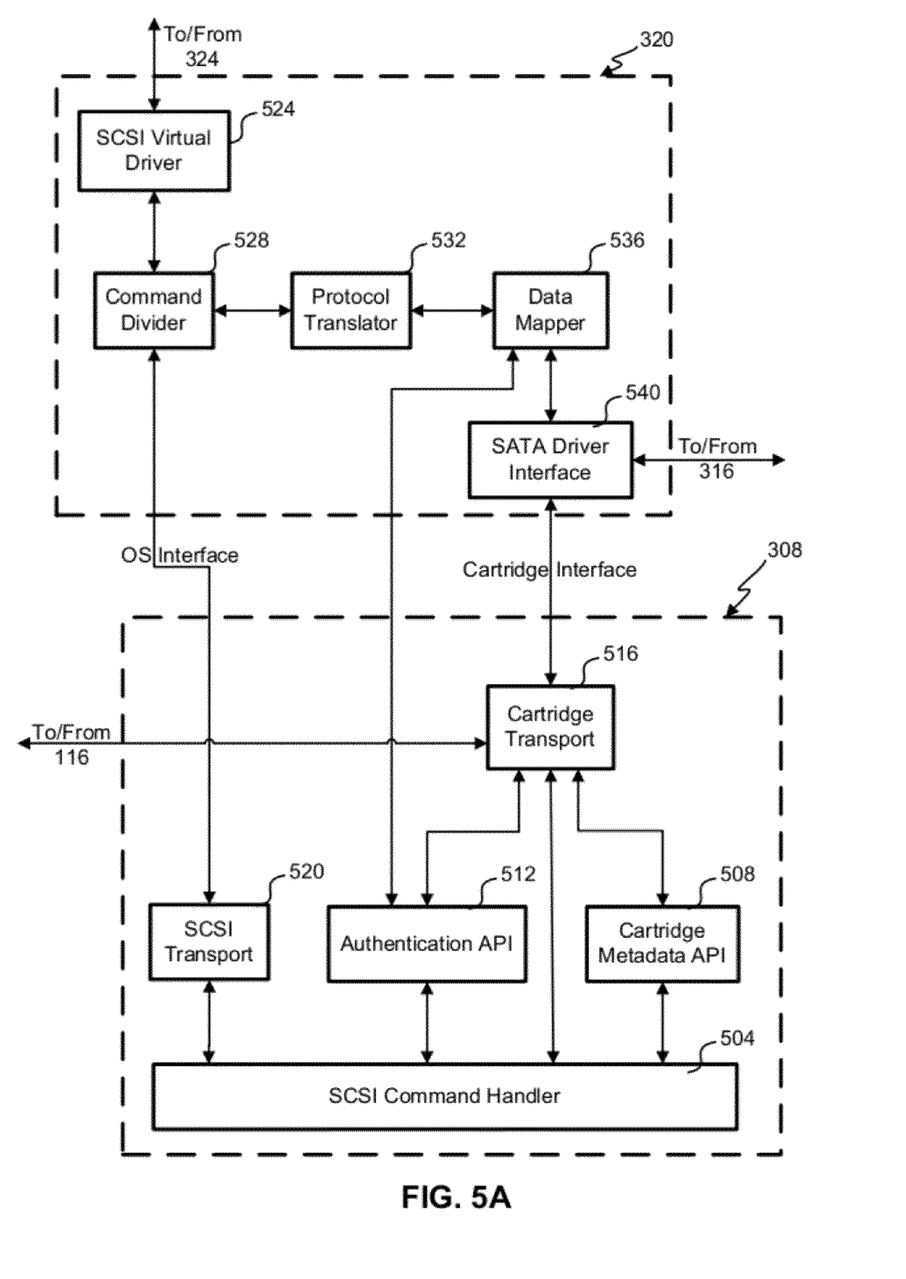
FIGS. 5A and 5B depict block diagrams of embodiments of a virtual device kernel component (VDKC) and a virtual device user component (VDUC) in detail.

Referring next to FIG. 5A, an embodiment of the VDKC 320 and VDUC 308 is shown in greater detail. The VDKC 320 includes a SCSI virtual driver 524, a command divider 528, a protocol translator 532, a data mapper 536, and a SATA driver interface 540. The VDKC 320 interface through two datapaths in this embodiment, namely an OS interface and a cartridge interface. The VDUC 308 includes a SCSI command handler 504, a cartridge metadata API 508, a authentication API 512, a cartridge transport 516 and a SCSI transport 520.

The VDKC 320 is in the driver stack of the kernel space 304 and appears to the OS 324 as a SCSI driver to a SCSI block device. Additionally, the VDKC 320 provides a persistent device reservation to keep a drive letter assigned to the cartridge dock 108 regardless of whether a data cartridge 112 is actually present. A SCSI virtual driver 524 is the interface to the OS 324. Data, commands and status are passed back and forth through the SCSI virtual driver 524 abstracted from the actual hardware and software implementing the SCSI block device.

The VDKC 320 strips off read/write commands from the OS 324 with the command divider 528. The VDKC 320 handles all data SCSI commands without involving the VDUC 308 in this embodiment. The VDKC 320 provides a pass through interface with minimal processing for data commands, queries for drive temperature and drive firmware updates. In another embodiment, temperature and firmware updates would not use the pass-through interface, which is reserved for reads/write access only.

The processing for SCSI commands passed through the VDKC 320 includes translation and mapping. The protocol translator 532 converts SCSI commands to their SATA or other protocol equivalent. The data mapper 536 is informed by the VDUC 308 where the user data area 408 is located on the hard drive 110 and offsets reads and writes accordingly. The SATA driver interface 540 is coupled to the SATA interface port driver 316 to issue the proper SATA commands to perform the requested command.

For SCSI commands that are not passed through, the command divider 528 passes them to the VDUC 308 for processing. The SCSI transport notifies the VDUC 308 when a new SCSI command is available and passes responses back to the VDKC 320. The received commands are passed to the SCSI command handler 504 where they are interpreted. The SCSI command handler 504 interacts with the cartridge dock 108 and possibly other components to respond to the command. Any results are passed by the SCSI transport 520 back to the VDKC 320.

The cartridge transport 516 manages interaction of the VDUC 308 with the VDKC 320, the cartridge dock 108 and the data cartridge 112 using the control channel and the data channel. The cartridge transport 516 notifies the VDKC 320 when a data cartridge 112 is inserted or removed from the cartridge dock 108 and identifies the capacity of the data cartridge 112. The capacity is the size of the user data area 408. SATA commands are sent to the hard drive 110 and responses are returned by the cartridge transport 516. Additionally, the dock controller 120 is interfaced with the cartridge transport 516.

The authentication API 512 validates the VDKC 320 and the data cartridge 112. Before interacting with the VDKC 320, the authentication API 512 confirms it hasn't been modified or hacked. A checksum or hash can be calculated against the software code for the VDKC 320. Other embodiments could use encryption, ciphers and/or code books to test the VDKC 320. The hard drive 110 has sectors with authentication information 404 that can be validated using an algorithm based upon information unique to the hard drive 110 and not easily modifiable. After authentication of the VDKC 320, the authentication API 512 provides password to the hard drive 110 that unlocks the hard drive 110 for user access.

The cartridge metadata API 508 accesses the metadata area 412 and other memory areas of the data cartridge 112. The metadata API 508 provides offsets for the data structure 400 that identifies the user data area 408. Without the knowledge the user data area 408 provided by the cartridge metadata API 508 and the password unlock provided by the authentication API 512, the VDKC 320 cannot effectively interact with the data cartridge 112. For example, the cartridge metadata API 508 interacts with the cartridge manufacturer information, model number, serial number, label information, etc. Additionally, the cartridge metadata API 508 reads and updates fields for cartridge load count, bytes written, bytes read, error count, read protect, write protect, etc. New vendor-specific information and fields can be added to the metadata area 412. Only the VDUC 308 has access to the metadata area 412 in this embodiment. Some embodiments may use the authentication API 512 to validate the integrity of the metadata area 412.

Figure 5B:
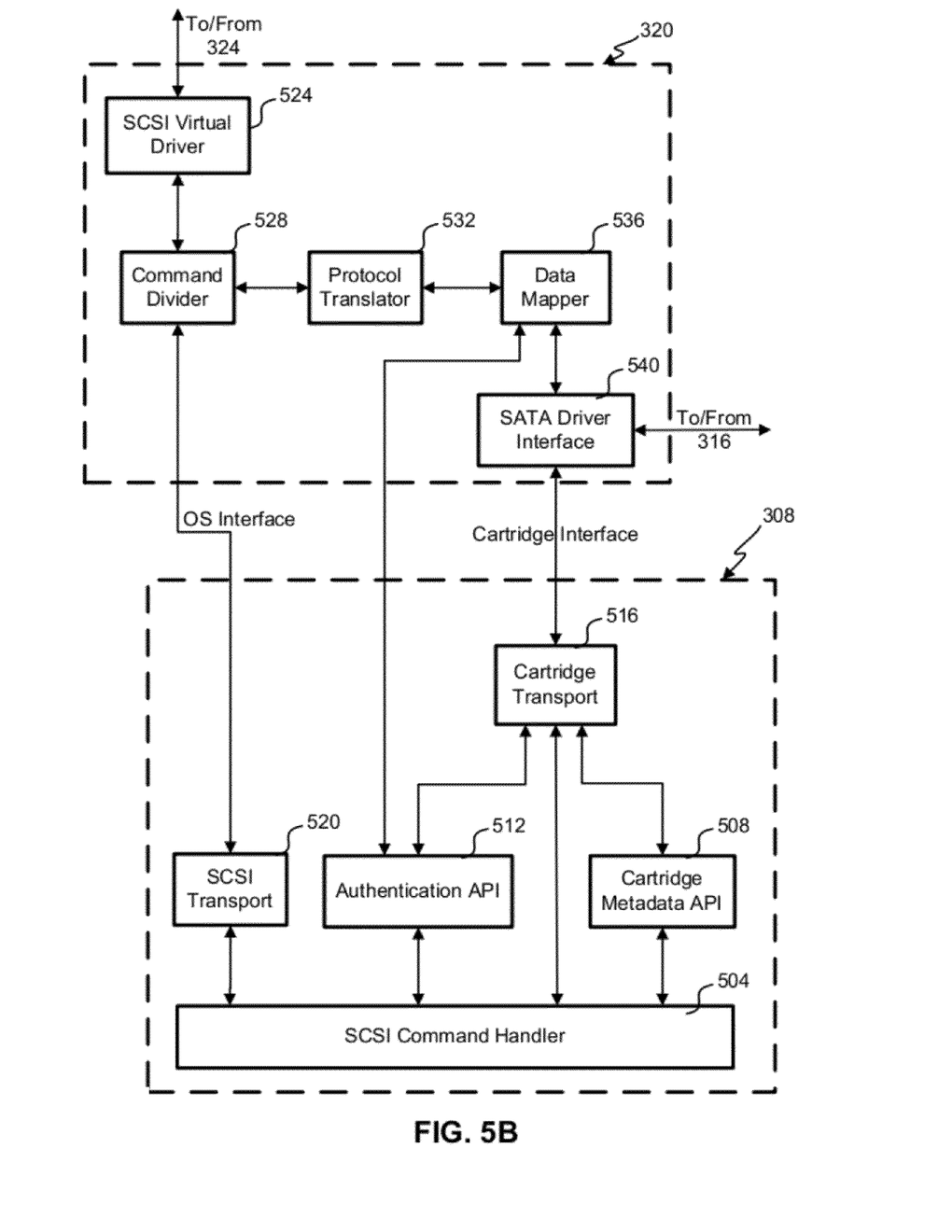

With reference to FIG. 5B, another embodiment of the VDKC 320 and VDUC 308 is shown in detail. This embodiment has a combined command and data channel rather than using a separate command channel.

Figure 6:
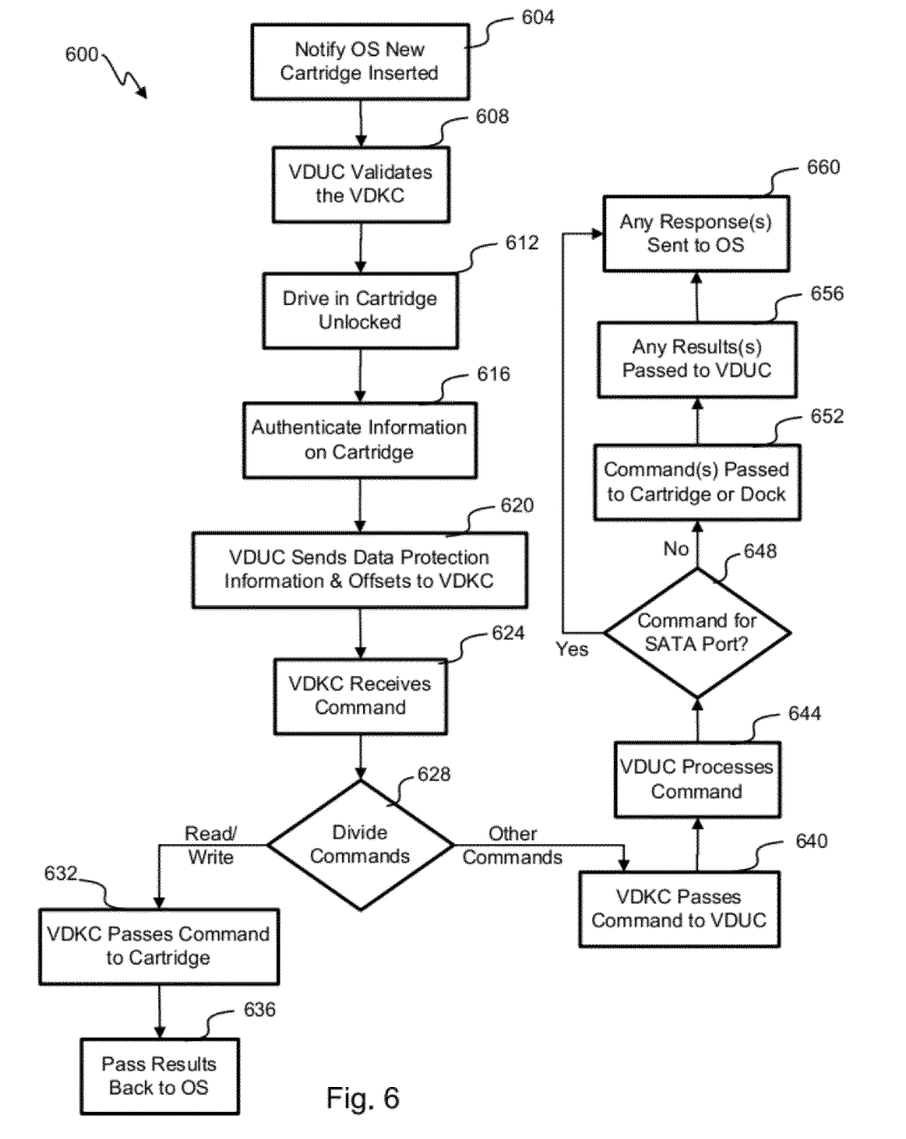
FIG. 6 illustrates a flowchart of an embodiment of a process for interfacing with a data cartridge.

Referring next to FIG. 6, an embodiment of a process 600 for interfacing with a data cartridge 112 is shown. The depicted portion of the process begins in block 604 where a new data cartridge 112 is inserted into the cartridge dock 108. The VDUC 308 authenticates the VDKC 320 in block 608. The hard drive 110 has a password lock according to the SATA protocol in this embodiment. The password is unique to the hard drive 110, but can be determined by the VDUC 308 with information from the hard drive 110. In block 612, the hard drive 110 is unlocked.

The authentication information 404 on the hard drive 110 is authenticated in block 616 to further confirm that he data cartridge 112 is authentic. After interrogation of hard drive 110 by the VDUC 308, the location of the user data area 408 is determined. Additionally, this embodiment uses optional encryption of the information on the hard drive 110. The encryption key(s) to protect data and offsets identifying the location of the user data area 408 are sent from the VDUC 308 to the VDKC 620. At this point, the VDKC 620 is capable of communication with the hard drive 110.

At some point, the OS 324 sends a SCSI command to the VDKC 320 in block 624. A determination is made in block 628 to divide the data commands to block 632 an the other commands to block 640. Where it is determined that it is a data command, the VDKC 320 translates the command to the protocol of the hard drive 110 and offsets the request to the proper location within the user data area 408 in block 632. Any result from the data command is passed back to the OS 324 in block 636.

If the SCSI command is for the VDUC 308, it is passed there in block 640. The VDUC 308 processes the command in block 644. Some commands require query or instruction to the data cartridge 112 and/or cartridge dock 108 while others do not. A determination in block 648 is made. Where the command can be processed by the VDUC 308 without reference to the command or data channel, processing goes from block 648 to block 660 where any response is passed back to the OS 324 through the VDKC 320.

Where there is interaction required with the cartridge dock 108 and/or data cartridge 112, it is performed in block 652. Any results are gathered or determined in block 656 and passed to the OS in block 660. Some determinations do not result in any response such that block 660 is not necessary. For example, the command may be to lock the data cartridge 112 into the cartridge dock 108. In another example, the command could be to eject the data cartridge 112. A change of status after the eject would be reported back to the OS 324 to reflect that the cartridge dock 108 is empty.

Figure 7:
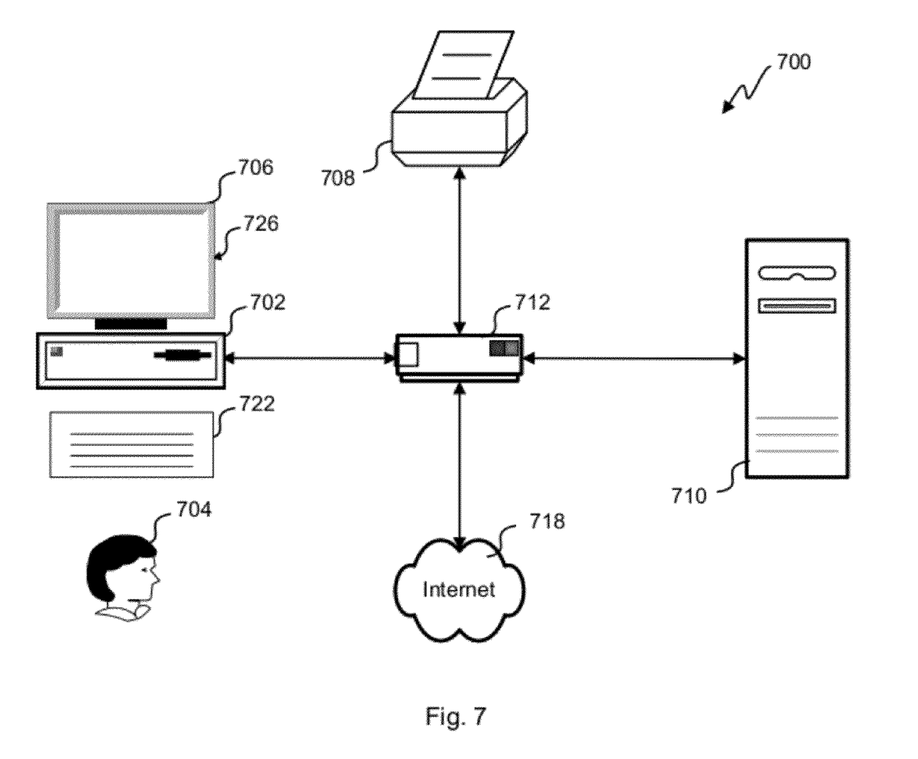
FIG. 7 depicts a block diagram of an embodiment of a computer system.

Referring next to FIG. 7, an exemplary environment with which embodiments of the invention may be implemented is shown with a computer system 700 that can be used by a user 704 to work with a cartridge dock and removable data cartridges. The computer system 700 can include a computer 702, keyboard 722, a network router 712, a printer 708, and a monitor 706. The monitor 706, processor 702 and keyboard 722 are part of a computer system 726, which can be a laptop computer, desktop computer, handheld computer, mainframe computer, etc. The monitor 706 can be a CRT, flat screen, etc.

A user 704 can input commands into the computer 702 using various input devices, such as a mouse, keyboard 722, track ball, touch screen, etc. If the computer system 700 comprises a mainframe, a user 704 can access the computer 702 using, for example, a terminal or terminal interface. Additionally, the computer system 726 may be connected to a printer 708 and a server 710 using a network router 712, which may connect to the Internet 718 or a WAN.

The server 710 may, for example, be used to store additional software programs and data. In one embodiment, software implementing the systems and methods described herein can be stored on a storage medium in the server 710. Thus, the software can be run from the storage medium in the server 710. In another embodiment, software implementing the systems and methods described herein can be stored on a storage medium in the computer 702. Thus, the software can be run from the storage medium in the computer system 726. Therefore, in this embodiment, the software can be used whether or not computer 702 is connected to network router 712. Printer 708 may be connected directly to computer 702, in which case, the computer system 726 can print whether or not it is connected to network router 712.

Figure 8:
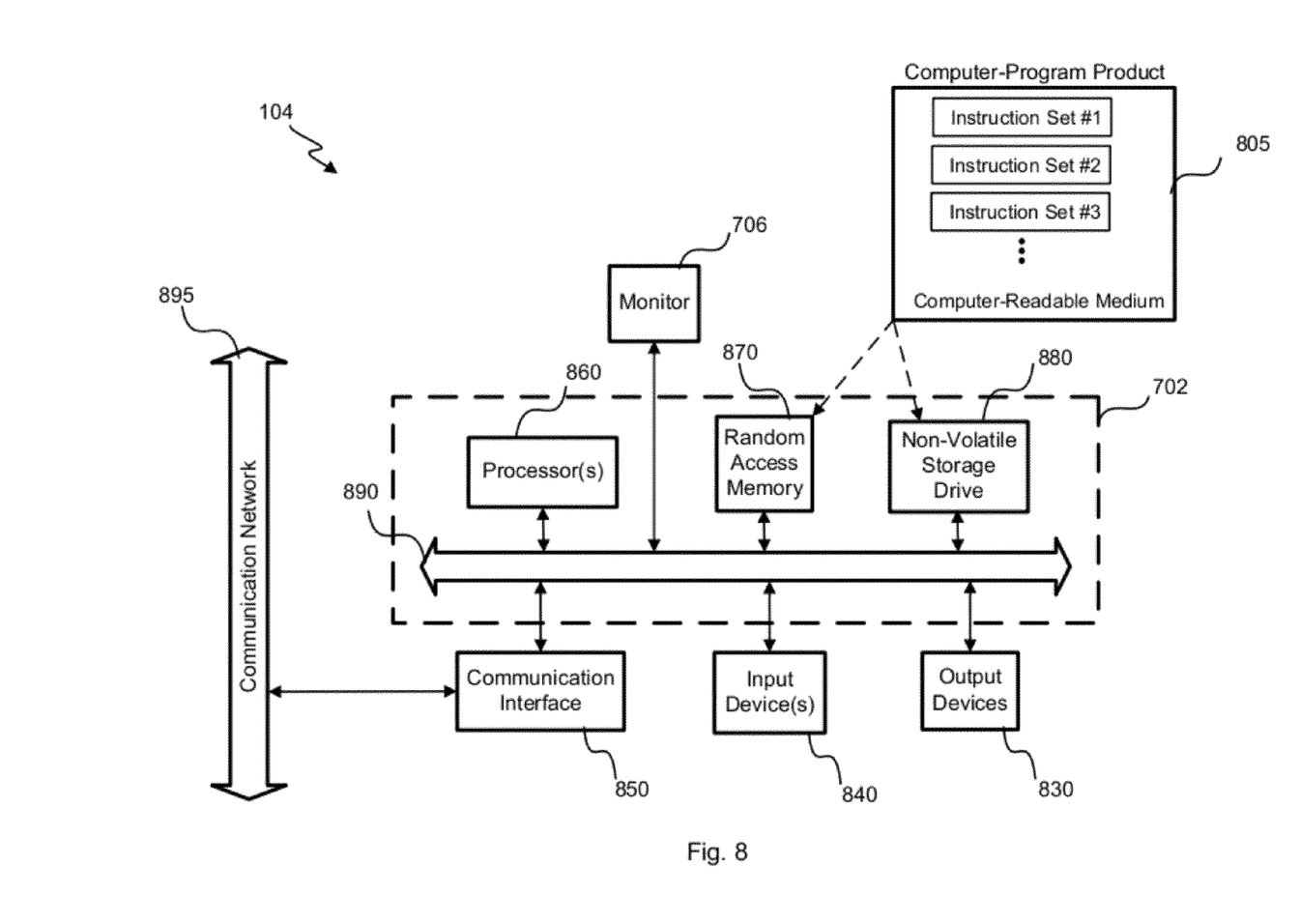
FIG. 8 depicts a block diagram of an embodiment of a special-purpose computer system.

With reference to FIG. 8, an embodiment of a special-purpose host computer system 104 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 726, it is transformed into the special-purpose host computer system 104 to perform interface to a hard drive dock 108 and data cartridge(s) 112.

Special-purpose host computer system 104 comprises a computer 702, a monitor 706 coupled to computer 702, one or more additional user output devices 830 (optional) coupled to computer 702, one or more user input devices 840 (e.g., keyboard, mouse, track ball, touch screen) coupled to computer 702, an optional communications interface 850 coupled to computer 702, a computer-program product 805 stored in a tangible computer-readable memory in computer 702. Computer-program product 805 directs host system 104 to perform the above-described methods. Computer 702 may include one or more processors 860 that communicate with a number of peripheral devices via a bus subsystem 890. These peripheral devices may include user output device(s) 830, user input device(s) 840, communications interface 850, and a storage subsystem, such as random access memory (RAM) 870 and non-volatile storage drive 880 (e.g., disk drive, optical drive, solid state drive), which are forms of tangible computer-readable memory.

Computer-program product 805 may be stored in non-volatile storage drive 880 or another computer-readable medium accessible to computer 702 and loaded into memory 870. Each processor 860 may comprise a microprocessor, such as a microprocessor from Intel® or Advanced Micro Devices, Inc.®, or the like. To support computer-program product 805, the computer 702 runs an operating system that handles the communications of product 805 with the above-noted components, as well as the communications between the above-noted components in support of the computer-program product 805. Exemplary operating systems include Windows® or the like from Microsoft Corporation, Solaris® from Sun Microsystems, LINUX, UNIX, and the like.

User input devices 840 include all possible types of devices and mechanisms to input information to computer system 702. These may include a keyboard, a keypad, a mouse, a scanner, a digital drawing pad, a touch screen incorporated into the display, audio input devices such as voice recognition systems, microphones, and other types of input devices. In various embodiments, user input devices 840 are typically embodied as a computer mouse, a trackball, a track pad, a joystick, wireless remote, a drawing tablet, a voice command system. User input devices 840 typically allow a user to select objects, icons, text and the like that appear on the monitor 706 via a command such as a click of a button or the like. User output devices 830 include all possible types of devices and mechanisms to output information from computer 702. These may include a display (e.g., monitor 706), printers, non-visual displays such as audio output devices, etc.

Communications interface 850 provides an interface to other communication networks and devices and may serve as an interface to receive data from and transmit data to other systems, WANs and/or the Internet 718. Embodiments of communications interface 850 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 850 may be coupled to a computer network, to a FireWire® bus, or the like. In other embodiments, communications interface 850 may be physically integrated on the motherboard of computer 702, and/or may be a software program, or the like.

RAM 870 and non-volatile storage drive 880 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 870 and non-volatile storage drive 880 may be configured to store the basic programming and data constructs that provide the functionality of various embodiments of the present invention, as described above.

Software instruction sets that provide the functionality of the present invention may be stored in RAM 870 and non-volatile storage drive 880. These instruction sets or code may be executed by the processor(s) 860. RAM 870 and non-volatile storage drive 880 may also provide a repository to store data and data structures used in accordance with the present invention. RAM 870 and non-volatile storage drive 880 may include a number of memories including a main random access memory (RAM) to store of instructions and data during program execution and a read-only memory (ROM) in which fixed instructions are stored. RAM 870 and non-volatile storage drive 880 may include a file storage subsystem providing persistent (non-volatile) storage of program and/or data files. RAM 870 and non-volatile storage drive 880 may also include removable storage systems, such as removable flash memory.

Bus subsystem 890 provides a mechanism to allow the various components and subsystems of computer 702 communicate with each other as intended. Although bus subsystem 890 is shown schematically as a single bus, alternative embodiments of the bus subsystem may utilize multiple busses or communication paths within the computer 702.

A number of variations and modifications of the disclosed embodiments can also be used. For example, above embodiments translate SCSI to SATA, but other embodiments could translate between any two protocols. One embodiment could receive SATA commands and convert them to SCSI for a SCSI data cartridge, for example.

While the principles of the disclosure have been described above in connection with specific apparatuses and methods, it is to be clearly understood that this description is made only by way of example and not as limitation on the scope of the disclosure.

What is claimed is:

1. A virtual device interface for a removable hard drive cartridge, the virtual device interface comprising:
   a kernel component configured to run in kernel space in a driver stack of an operating system, wherein the kernel component:
   receives a plurality of commands from a process;
   separates the plurality of commands into at least:
   a first set of commands comprising read and/or write commands, and
   a second set of commands comprising commands that control a cartridge dock, the cartridge dock being configured to receive the removable hard drive cartridge; and
   passes the first set of commands to a drive interface port to read and/or write data using the removable hard drive cartridge; and
   a user-space driver configured to run in user space, wherein the user-space driver:
   receives the second set of commands from the kernel component,
   authenticates one or both of the kernel component and the removable hard drive cartridge, and
   authorizes use of the removable hard drive cartridge.

2. The virtual device interface for the removable hard drive cartridge as recited in claim 1, wherein:
   the kernel component receives an offset from the user-space driver, and
   the offset is used to identify a user data area accessible from the operating system.

3. The virtual device interface for the removable hard drive cartridge as recited in claim 1, further comprising a control interface that sends commands from the user-space driver to the cartridge dock.

4. The virtual device interface for the removable hard drive cartridge as recited in claim 1, wherein the kernel component passes through read and write requests from the operating system to the removable hard drive cartridge without the read and write request passing to the user-space driver.

5. The virtual device interface for the removable hard drive cartridge as recited in claim 1, wherein the kernel component sends commands to the cartridge dock to interact with two or more of:
   an eject mechanism to move the removable hard drive cartridge,
   a write protect switch on the removable hard drive cartridge,
   a status interface, and
   a button.

6. The virtual device interface for the removable hard drive cartridge as recited in claim 1, wherein the removable hard drive cartridge includes a solid state drive.

7. The virtual device interface for the removable hard drive cartridge as recited in claim 1, wherein authorizing use of the removable hard drive cartridge comprises providing a password unique to the removable hard drive cartridge that unlocks a hard drive of the hard drive cartridge.

8. The virtual device interface for the removable hard drive cartridge as recited in claim 1, wherein authorizing use of the removable hard drive cartridge comprises providing a password unique to the removable hard drive cartridge that unlocks a hard drive of the removable hard drive cartridge.

9. A virtual device interface for a removable hard drive cartridge, the virtual device interface comprising:
   a first component, wherein the first component:
   receives a plurality of commands from a process;
   separates the plurality of commands into at least:
   a first set of commands comprising read and/or write commands, and
   a second set of commands comprising commands that control a cartridge dock, the cartridge dock being configured to receive the removable hard drive cartridge; and passes the first set of commands to a drive interface port to read and/or write data using the removable hard drive cartridge; and a second component, wherein the second component:
receives the second set of commands from the first component,
authenticates one or both of the first component and the removable hard drive cartridge, and
authorizes use of the removable hard drive cartridge, wherein:
the first component comprises a driver that runs in either kernel space in a driver stack of an operating system or in user space, and
the second component comprises a driver that runs in either kernel space in the driver stack of the operating system or in user space.

10. The virtual device interface for the removable hard drive cartridge as recited in claim 9, wherein:
the first component receives an offset from the second component, and
the offset is used to identify a user data area of the removable hard drive cartridge that is accessible from the operating system.

11. The virtual device interface for the removable hard drive cartridge as recited in claim 9, further comprising a control interface that sends commands from the second component to the cartridge dock.

12. The virtual device interface for the removable hard drive cartridge as recited in claim 9, wherein the first component sends commands to the cartridge dock to interact with two or more of:
an eject mechanism to move the removable hard drive cartridge,
a write protect switch on the removable hard drive cartridge,
a status interface, and
a button.

13. The virtual device interface for the removable hard drive cartridge as recited in claim 9, wherein the removable hard drive cartridge includes a solid state drive.

14. The virtual device interface for the removable hard drive cartridge as recited in claim 9, wherein the first component runs in kernel space.

15. The virtual device interface for the removable hard drive cartridge as recited in claim 9, wherein the second component runs in user space.

16. A non-transitory storage media with virtual device interface code for execution on a processor to operate a removable hard drive cartridge, the virtual device interface code comprising code for:
a first component, wherein the first component:
receives a plurality of commands from a process;
separates the plurality of commands into:
a first set of commands comprising read and/or write commands, and
a second set of commands comprising commands that control a cartridge dock, the cartridge dock being configured to receive the removable hard drive cartridge; and
passes the first set of commands to a drive interface port to read and/or write data using the removable hard drive cartridge; and a second component, wherein the second component:
receives the second set of commands from the first component,
authenticates one or both of the first component and the removable hard drive cartridge, and
authorizes use of the removable hard drive cartridge, wherein:
the first component comprises a driver that runs in either kernel space in a driver stack of an operating system or in user space, and
the second component comprises a driver that runs in either kernel space in the driver stack of the operating system or in user space.

17. The non-transitory storage media with virtual device interface code for execution on a processor to operate the removable hard drive cartridge as recited in claim 16, further comprising code for:
the first component receiving an offset from the second component, wherein the offset is used to identify a user data area of the removable hard drive cartridge that is accessible from the operating system.

18. The non-transitory storage media with virtual device interface code for execution on a processor to operate the removable hard drive cartridge as recited in claim 16, further comprising code for the first component to send commands to the cartridge dock to interact with two or more of:
an eject mechanism to move the removable hard drive cartridge,
a write protect switch on the removable hard drive cartridge,
a status interface, and
a button.

19. The non-transitory storage media with virtual device interface code for execution on a processor to operate the removable hard drive cartridge as recited in claim 16, wherein authorizing use of the removable hard drive cartridge comprises providing a password unique to the removable hard drive cartridge that unlocks a hard drive of the removable hard drive cartridge.

20. The non-transitory storage media with virtual device interface code for execution on a processor to operate the removable hard drive cartridge as recited in claim 16, wherein the first component runs in kernel space.

21. The non-transitory storage media with virtual device interface code for execution on a processor to operate the removable hard drive cartridge as recited in claim 16, wherein the second component runs in user space.

* * * * *